US008856080B2

(12) United States Patent
Khanzode et al.

(10) Patent No.: US 8,856,080 B2
(45) Date of Patent: Oct. 7, 2014

(54) BACKUP USING METADATA VIRTUAL HARD DRIVE AND DIFFERENTIAL VIRTUAL HARD DRIVE

(75) Inventors: Pankaj V. Khanzode, Hyderabad (IN); Vanita Prabhu, Hyderabad (IN); Abid Ali, Hyderabad (IN); Amit Singla, Hyderabad (IN); Dilip Madhusudan Ranade, Pune (IN); Sriram Balasubramaniam, Hyderabad (IN); Karandeep S. Anand, Kirkland, WA (US); Charumathy Srinivasan, Hyderabad (IN); Manoj K. Valiyaparambil, Hyderabad (IN); RaviSankar V. Pudipeddi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 767 days.

(21) Appl. No.: 12/609,244

(22) Filed: Oct. 30, 2009

(65) Prior Publication Data

US 2011/0106768 A1    May 5, 2011

(51) Int. Cl.
  *G06F 17/30* (2006.01)
  *G06F 11/14* (2006.01)
(52) U.S. Cl.
  CPC ........ *G06F 11/1458* (2013.01); *G06F 11/1451* (2013.01)
  USPC .......................................... 707/654; 707/746
(58) Field of Classification Search
  USPC ................................. 707/654, 746
  See application file for complete search history.

(56) References Cited

U.S. PATENT DOCUMENTS

| 5,881,266 | A  | * | 3/1999 | Matsumoto ................... 711/134 |
| 2005/0169064 | A1 | * | 8/2005 | Kiselev et al. ........... 365/189.05 |
| 2006/0005189 | A1 |   | 1/2006 | Vega et al. |
| 2006/0206547 | A1 | * | 9/2006 | Kulkarni et al. .............. 707/205 |
| 2006/0217952 | A1 |   | 9/2006 | Wu et al. |
| 2006/0218544 | A1 |   | 9/2006 | Chakraborty et al. |
| 2007/0244938 | A1 |   | 10/2007 | Michael et al. |

(Continued)

FOREIGN PATENT DOCUMENTS

| JP | 2001312421 A | 11/2001 |
| JP | 2008250667 A | 10/2008 |
| JP | 2009238036 A | 10/2009 |

OTHER PUBLICATIONS

"A Guide to Windows Vista Backup Technologies", Retrieved at <<http://technet.microsoft.com/en-us/magazine/2007.09.backup.aspx>> Aug. 7, 2009, pp. 1-9.

(Continued)

*Primary Examiner* — Belix M Ortiz Ditren
(74) *Attorney, Agent, or Firm* — Jim Sfekas; Kate Drakos; Micky Minhas (57) ABSTRACT

Methods and systems are disclosed for backup using a metadata virtual hard drive (VHD) and a differential VHD. A particular system includes a memory device that stores files and a backup agent configured to detect changes to the files. The system includes a translation module configured to translate the detected changes into VHD formatted changes and a VHD module configured to write the VHD formatted changes to a metadata VHD stored at the memory device. The VHD module is also configured to generate a differential VHD based on the metadata VHD. A network interface at the system is configured to transmit the metadata VHD and the differential VHD to a remote storage device.

24 Claims, 9 Drawing Sheets

(56) References Cited

U.S. PATENT DOCUMENTS

| | | | |
|---|---|---|---|
| 2007/0276885 | A1 | 11/2007 | Valiyaparambil et al. |
| 2008/0244205 | A1 | 10/2008 | Amano et al. |
| 2009/0006534 | A1 | 1/2009 | Fries et al. |
| 2009/0157942 | A1 | 6/2009 | Kulkarni |
| 2009/0172160 | A1* | 7/2009 | Klein .......................... 709/225 |
| 2010/0332549 | A1* | 12/2010 | Nichols et al. ............... 707/802 |

OTHER PUBLICATIONS

"Running a Domain Controller in Virtual Server 2005", Retrieved at <<http://download.microsoft.com/download/1/8/4/18450ebb-bd47-47b4-9957-40f185fbbaa7/DC_VS2005.doc>> Nov. 2004, pp. 1-34.

"Performance Tuning Guidelines for Windows Server 2008", Retrieved at <<http://download.microsoft.com/download/9/c/5/9c5b2167-8017-4bae-9fde-d599bac8184a/Perf-tun-srv.docx>> May 20, 2009, pp. 1-83.

"Deploying Citrix XenServer 5.0 with Dell EqualLogic PS Series storage", Retrieved at <<http://webjam-upload.s3.amazonaws.com/citrix-xenserver-equallogic_final_c07a087e890643ed9786c3f82f4ebeb6_3669_.pdf >> pp. 1-29.

"Citrix Xenserver V5.0 and Netapp Storage Best Practices", Retrieved at <<http://www.citrix.lu/site/resources/dynamic/partnerDocs/CitrixXenServerv50andNetAppStorageBestPracticesGuide.pdf>> Mar. 2009 | Version 2.1, pp. 1-79.

"The International Search Report and the Written Opinion," received from the International Searching Authority (ISA/KR) for International Application No. PCT/US2010/052325, Mailed Date: May 26, 2011, Filed Date: Oct. 12, 2010, pp. 9.

Notice on the First Office Action received from the State Intellectual Property Office of the Peoples's Republic of China, for Application No. 201080049261.2, dated Jan. 26, 2014, with English translation, 12 pages.

Notice on the Second Office Action received from the Japanese Patent Office, for Application No. 2012-536847, date mailed Apr. 2, 2014, with English translation, 4 pages.

* cited by examiner

FIG. 9 ns and methods of backup using a metadata virtual hard drive (VHD) and a differential VHD are disclosed. A backup VHD for a data volume at a computer system and a metadata VHD corresponding to the backup VHD are created during an initial backup operation. The backup VHD is transmitted to a remote storage location (e.g., an online cloud storage location) while the metadata VHD, which may be substantially smaller in size than the backup VHD, is kept at the computer system. When changes are made to files at the data volume, a differential VHD is created indicating the changes, and the metadata VHD is updated to reflect the changes. The differential VHD may also be substantially smaller than the backup VHD, because the differential VHD may only include portions of files that have changed since the previous backup operation. During a subsequent backup operation, the data volume may be backed up without creating a new backup VHD. Instead, a copy of the updated metadata VHD and the differential VHD may be transmitted to the remote storage location.

BACKUP USING METADATA VIRTUAL HARD DRIVE AND DIFFERENTIAL VIRTUAL HARD DRIVE

BACKGROUND

As businesses have become more computer-oriented, safeguarding against accidental data loss has increased in importance. Many enterprise level data backup systems include some form of on-site data storage. For example, an enterprise may periodically store backup data to data storage devices that are dedicated to hosting backup data (e.g., dedicated backup storage servers). On a user level, the hard disk at a user workstation may be partitioned (e.g., divided in half), and data stored at a primary partition may periodically be copied to a secondary partition. When the primary partition is restored, data from the secondary partition may be copied to the primary partition. Such backup systems may increase data storage costs at the enterprise (e.g., because backup disks or other data storage is purchased and maintained) and decrease data storage utilization at the enterprise (e.g., because some of the data storage capacity is dedicated to backups, a reduced portion of the data storage capacity is available for storing "active" data).

SUMMARY

Systems and methods of backup using a metadata virtual hard drive (VHD) and a differential VHD are disclosed. A backup VHD for a data volume at a computer system and a metadata VHD corresponding to the backup VHD are created during an initial backup operation. The backup VHD is transmitted to a remote storage location (e.g., an online cloud storage location) while the metadata VHD, which may be substantially smaller in size than the backup VHD, is kept at the computer system. When changes are made to files at the data volume, a differential VHD is created indicating the changes, and the metadata VHD is updated to reflect the changes. The differential VHD may also be substantially smaller than the backup VHD, because the differential VHD may only include portions of files that have changed since the previous backup operation. During a subsequent backup operation, the data volume may be backed up without creating a new backup VHD. Instead, a copy of the updated metadata VHD and the differential VHD may be transmitted to the remote storage location.

Through the use of metadata VHDs and differential VHDs, a data volume of a computer system may be backed up without needing to store backup VHDs at the computer system. Furthermore, the metadata VHDs and differential VHDs may be used to restore particular files at other computer systems, without downloading the entire backup VHD to the other computer systems. Thus, the use of metadata VHDs and differential VHDs may enable single-instance machine independent backup. For example, multiple computer systems may recover files from a single remotely stored backup VHD.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method is disclosed that includes, during an initial backup operation at a computer system, creating a backup VHD of a data volume at a storage device of the computer system, creating a metadata VHD corresponding to the backup VHD, and transmitting the backup VHD to a remote storage location. The method also includes detecting a change to a file of the data volume after completion of the initial backup operation. The method further includes creating a differential VHD based on the metadata VHD, where the differential VHD indicates the change to the file. The method includes updating the metadata VHD to reflect the change to the file. The method also includes, during a subsequent backup operation at the computer system, transmitting a copy of the updated metadata VHD and the differential VHD to the remote storage location.

In another particular embodiment, a computer system is disclosed. The computer system includes a memory device including files stored in accordance with a file system and a backup agent configured to detect changes to the files. The computer system also includes a translation module configured to translate the detected changes to VHD formatted changes. The computer system further includes a VHD module configured to write the VHD formatted changes to a metadata VHD stored at the memory device and to generate a differential VHD based on the metadata VHD. The computer system includes a network interface configured to transmit the metadata VHD and the differential VHD to a remote storage device.

In another particular embodiment, a computer-readable medium is disclosed that includes instructions, that when executed by a computer, cause the computer to receive a backup VHD at a first point in time (PIT) and receive a first forward differential VHD at a second PIT. The second PIT is subsequent to the first PIT, and the first forward differential VHD indicates changes to the backup VHD since the first PIT. The computer-readable medium also includes instructions, that when executed by the computer, cause the computer to transmit a particular file from the backup VHD to a remote client in response to receiving an indication that the remote client requests to revert the particular file to the first PIT. The computer-readable medium further includes instructions, that when executed by the computer, cause the computer to transmit changed portions of the particular file from the first forward differential VHD and unchanged portions of the particular file from the backup VHD to the remote client in response to receiving an indication that the remote client requests to revert the particular file to the second PIT.

It should be noted that although backup using metadata hard drives and differential hard drives is described herein with respect to a virtual hard drive (VHD) format, the backup methodologies described may be used with any format that is capable of defining a file or block system. Further, although the backup methodologies have been illustrated using Windows-based file systems (e.g., NT File System (NTFS) and File Allocation Table (FAT)), the backup methodologies may be used with any file system, including user-defined file systems (UDFSs).

Figure 1:
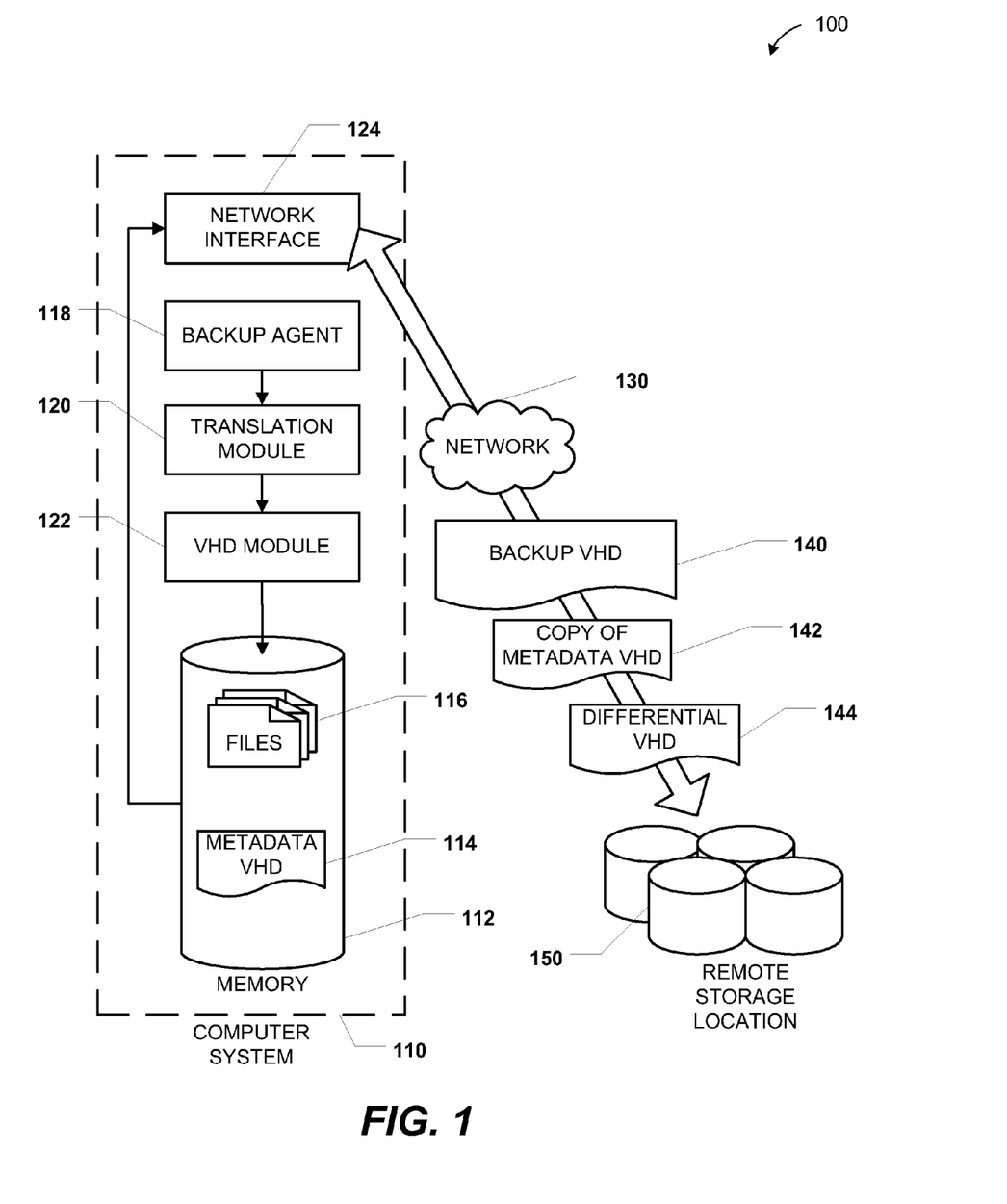
FIG. 1 is a block diagram to illustrate a particular embodiment of a system of backup using a metadata VHD and a differential VHD.

FIG. 1 is a block diagram to illustrate a particular embodiment of a system 100 of backup using a metadata virtual hard drive (VHD) and a differential VHD. The system 100 includes a computer system 110 that is communicatively coupled to a remote storage location 150 via a network 130. Generally, the system 100 may be used to backup data volumes of the computer system 110 to the remote storage location 150. For example, the remote storage location 150 may be an online cloud storage location or a network share (e.g., located at another computer, accessible via a local area network (LAN), accessible via a wide area network (WAN), or any combination thereof).

The computer system 110 includes a memory 112. For example, the memory 112 may be random access memory (RAM) or a read-only memory (ROM) at the computer system 112. In a particular embodiment, the memory 112 is a data storage device at the computer system 112, such as a hard disk or removable storage device. The memory 112 may be utilized by the computer system 110 to store one or more files 116. The memory 112 may also store a metadata VHD 114 generated and updated as described herein.

The computer system 110 includes a backup agent 118, a translation module 120, and a VHD module 122. The backup agent 118 may detect changes to the files 116 stored at the memory 112. For example the backup agent 118 may detect that a user at the computer system 110 has modified one of the files 116.

The translation module 120 may convert the changes to the files 116 detected by the backup agent 118 into VHD formatted changes. For example, when the files 116 are stored at the memory 112 in accordance with an NT file system (NTFS), the translation module 120 may convert the changes detected by the backup agent 118 into VHD formatted changes based on NTFS directory structure information and NTFS file extents information associated with the files 116. It should be noted that the features disclosed herein are explained in the context of NTFS for illustrative purposes only. Backup using metadata VHDs and differential VHDs as described herein may be used with other file systems.

The VHD module 122 may write the VHD formatted changes produced by the translation module 120 to the metadata VHD 114 at the memory 112, so that the metadata VHD 114 reflects the changes to the files 116 detected by the backup agent 118. The metadata VHD 114 may be substantially smaller in size than the files 116, because the metadata VHD 114 may include metadata associated with the files 116 but not the contents of the files 116. For example, the metadata VHD 114 may include NTFS extent information, NTFS reparse points, and directory structure information. In a particular embodiment, instead of storing the contents of the files 116, the metadata VHD 114 includes file pointers to corresponding copies of the files 116 stored within the backup VHD 140 at the remote storage location 150. The VHD module 122 may also generate, during backup operations, differential VHDs (e.g., the differential VHD 144) based on the metadata VHD 114. In a particular embodiment, the differential VHD generated during a particular backup operation is a forward differential VHD that indicates changes to the files 116 since a previous backup operation. In a particular embodiment, a differential VHD includes changed portions of the files 116 since the previous backup operation but does not include unchanged portions of the files 116 since the previous backup operation. The VHD module 122 may generate differential VHDs without accessing the backup VHD 140 at the remote storage location 150.

The computer system 110 also includes a network interface 124. The network interface 124 may transmit data to the remote storage location 150 via the network 130. For example, the network interface 124 may be a wired or wireless network interface such as an Ethernet interface or an IEEE 802.11 wireless networking interface, and the network 130 may be a local area network (LAN), a wide area network (WAN), or the Internet. During an initial backup operation at the computer system 110, the network interface may transmit a backup VHD 140 to the remote storage location 150. In a particular embodiment, the backup VHD 140 includes copies of all of the files 116. The backup VHD 140 may be stored at the remote storage location 150. During subsequent backup operations, the network interface 124 may transmit a copy 142 of the metadata VHD 114 and the differential VHD 144 to the remote storage location 150, where both the metadata VHD 114 and the differential VHD 144 are substantially smaller in size than the backup VHD 140. In a particular embodiment, the remote storage location 150 is an online cloud storage location that stores the copy 142 of the metadata VHD 114 and the differential VHD 144.

In operation, the system 100 may be used to efficiently backup data from the computer system 110 to the remote storage location 150. For example, during an initial backup operation, the VHD module 122 may generate the backup VHD 140, and the network interface 124 may transmit the backup VHD 140 to the remote storage location 150 via the network 130. In a particular embodiment, the backup VHD 140 is automatically generated and transmitted to the remote storage location 150 when the computer system 110 is idle or not in use. The metadata VHD 114 may also be generated during the initial backup operation.

The backup agent 118 at the computer system 110 may detect and track changes to the files 116 at the computer system 110. For example, the backup agent 118 may maintain a log of changes to the files 116 since the last successfully completed backup operation at the computer system 110. The translation module 120 may translate the changes to the files 116 detected by the backup agent 118 into a VHD format. During a subsequent backup operation (e.g., an automatically scheduled backup operation or a user-initiated backup operation), a differential VHD 144 indicating the changes to the files 116 may be created, and the metadata VHD 114 may be updated to reflect the changes to the files 116. The differential VHD 144 and a copy 142 of the metadata VHD 114 may be transmitted to the remote storage location 150.

During a second subsequent backup operation, a second differential VHD may be created based on the updated metadata VHD 114, the updated metadata VHD 144 may be re-updated, and a copy of the twice-updated metadata VHD 114 and the second differential VHD (not shown in FIG. 1) may be transmitted to the remote storage location 150.

It will be appreciated that the system 100 of FIG. 1 may improve performance of the computer system 110 by transmitting backup data to the remote storage location 150, thereby increasing the amount of available storage space at the memory 112. It will also be appreciated that the system 100 of FIG. 1 may improve performance by transmitting larger backup VHDs to the remote storage location 150 during an initial backup operation and by transmitting smaller metadata VHDs and differential VHDs to the remote storage location 150 during subsequent backup operations. It will further be appreciated that the backup VHD 140, the copy 142 of the metadata VHD 114, and the differential VHD 144 may be used to restore the files 116 at the computer system 110. For example, the computer system 110 may restore a particular file of the files 116 to a point in time (PIT) corresponding to the initial backup operation by downloading the particular file from the backup VHD 140 at the remote storage location 150. The particular file may be restored to a PIT corresponding to a first subsequent backup operation (e.g., the particular file in a "changed" state) by downloading unchanged portions of the particular file from the backup VHD 140 and by downloading changed portions of the particular file from the differential VHD 144 to the computer system 110. The particular file may be restored to a PIT corresponding to a second backup operation (e.g., the particular file in a "twice-changed" state) by downloading unchanged portions of the particular file from the backup VHD and by downloading changed portions of the particular file from the differential VHD 144 and a second differential VHD.

It should be noted that although the particular embodiment illustrated in FIG. 1 depicts backing up data from a computer system 110 to a remote storage location 150, backing up data from the remote storage location 150 to another remote storage location may be performed in a similar fashion. It will thus be appreciated that the backup methodologies illustrated in FIG. 1 may enable data replication and data redundancy scenarios that use multiple remote storage locations (e.g., online cloud stores). For example, a first layer of data redundancy may be achieved with respect to a computer system at an enterprise by backing up data from the computer system to a network share (e.g., server) located at the enterprise. A second layer of data redundancy may be achieved by backing up data from the network share (e.g., backup data from all such computer systems at the enterprise) to an online cloud store.

Figure 2:
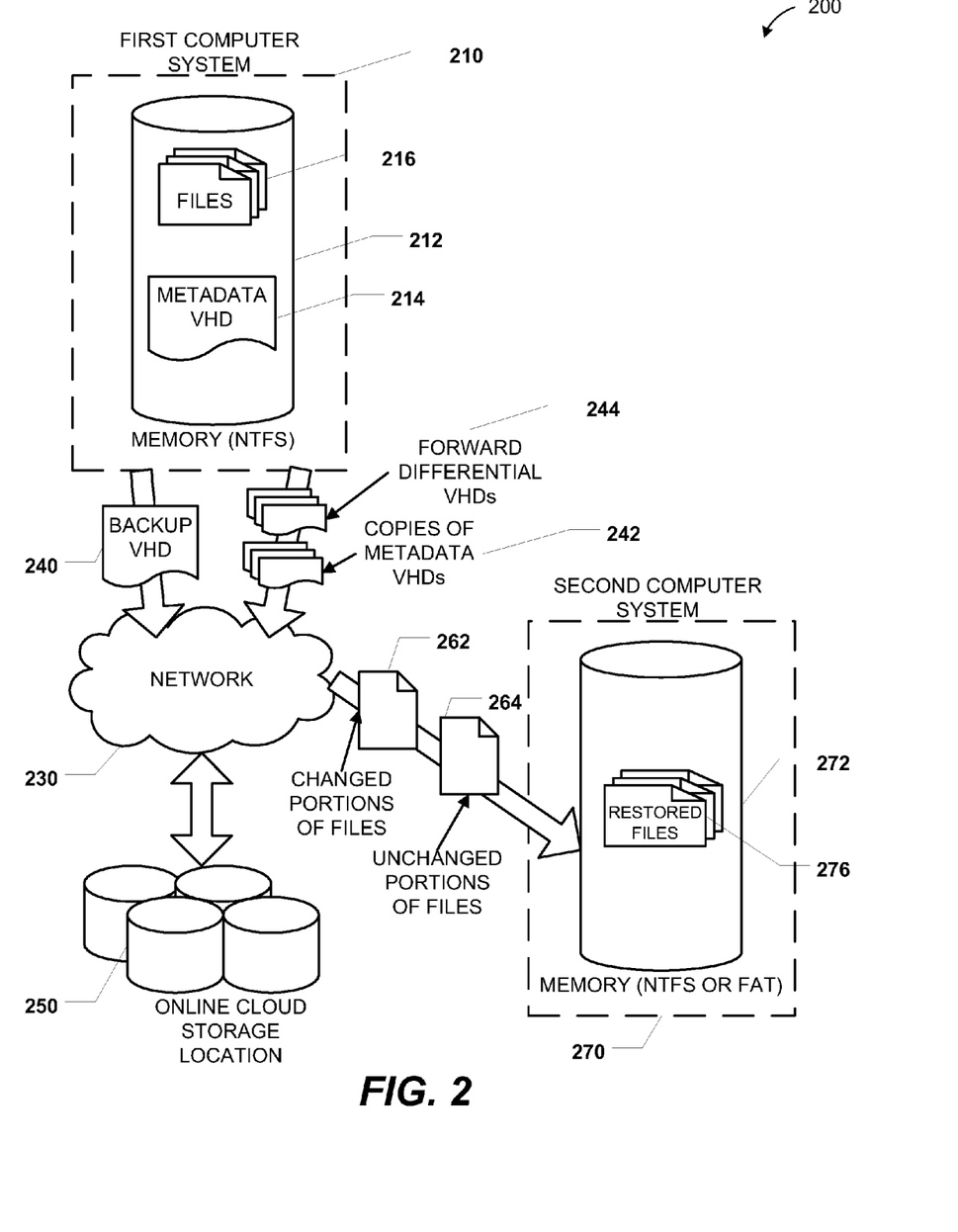
FIG. 2 is a block diagram to illustrate another particular embodiment of a system of backup using a metadata VHD and a differential VHD.

FIG. 2 is a block diagram to illustrate another particular embodiment of a system 200 of backup using a metadata VHD and a differential VHD. The system 200 includes a first computer system 210 and a second computer system 270 communicatively coupled to an online cloud storage location 250 via a network 230. In an illustrative embodiment, the first computer system 210 is the computer system 110 of FIG. 1, the online cloud storage location 250 is the remote storage location 150 of FIG. 1, and the network 230 is the network 130 of FIG. 1.

The first computer system 210 includes a memory 212 that stores files 216 in accordance with the NT file system (NTFS). It should be noted that the features disclosed herein are explained in the context of NTFS for illustrative purposes only. Backup using metadata VHDs and differential VHDs as described herein may be used with other file systems. The memory 212 may also include a metadata VHD 214 generated and updated during backup operations as described herein with reference to the metadata VHD 114 of FIG. 1. The first computer system 210 may transmit a backup VHD 240, copies 242 of the metadata VHD 214, and forward differential VHDs 244 to the online cloud storage location 250 as described herein with reference to the backup VHD 140, the copy 142 of the metadata VHD 114, and the forward differential VHD 144 of FIG. 1.

The second computer system 270 includes a memory 272. For example, the memory 272 may store files in accordance with the NTFS file system or a File Allocation Table (FAT) file system, such as FAT16, FAT32, or extended FAT (exFAT). The system 200 of FIG. 2 may be used to restore files at the first computer system 210, as described herein with respect to the computer system 110 of FIG. 1. The system 200 of FIG. 2 may also be used to restore files at the second computer system 270.

During an initial backup operation at the first computer system 210, the backup VHD 240 may be transmitted to the online cloud storage location 250. During subsequent backup operations at the computer system 210, the copies 242 of the metadata VHD 214 and the forward differential VHDs 244 may be transmitted to the online cloud storage location 250. The files 240, 242, and 244 may be used to restore the files 216 to a computer system other than the computer system 210. For example, the second computer system 270 may generate restored files 276 (e.g., copies of the files 216). To restore the files 216 to a point in time (PIT) corresponding to the initial backup operation at the first computer system 210, the second computer system 270 may download the files 216 from the backup VHD 240 at the online cloud storage location 250 and store them as the restored files 276. To restore the files 216 to a PIT corresponding to a subsequent backup operation at the first computer system 210, the second computer system 270 may download unchanged portions 264 of the files 216 from the backup VHD 240 and may download changed portions 262 of the files 216 from one or more of the forward differential VHDs 244 at the online cloud storage location 250. The second computer system 270 may then generate the restored files 276 by combining the changed portions 262 and the unchanged portions 264. The second computer system 270 may also download a copy of the metadata VHD 214 from the online cloud storage location 250 corresponding to the PIT associated with the restored files 276, so that future changes to the restored files 276 may be backed up to the online cloud storage location 250 as described herein with respect to the first computer system 210. In a particular embodiment, the downloaded copy of the metadata VHD 214 may be used at the second computer system 270 to browse, search, and initiate granular recovery of particular files stored at the backup VHD 250. In a particular embodiment, such browsing, searching, and recovery are performed via an application (e.g., operating system utility) at the second computer system 270.

It will be appreciated that the system 200 of FIG. 2 may enable the sharing of backup data (e.g., the files 240, 242, and 244) across multiple computer systems (e.g., the computer systems 210 and 270). It will thus be appreciated that the system 200 of FIG. 2 may enable efficient backup and restore operations at multiple computer systems.

Figure 3:
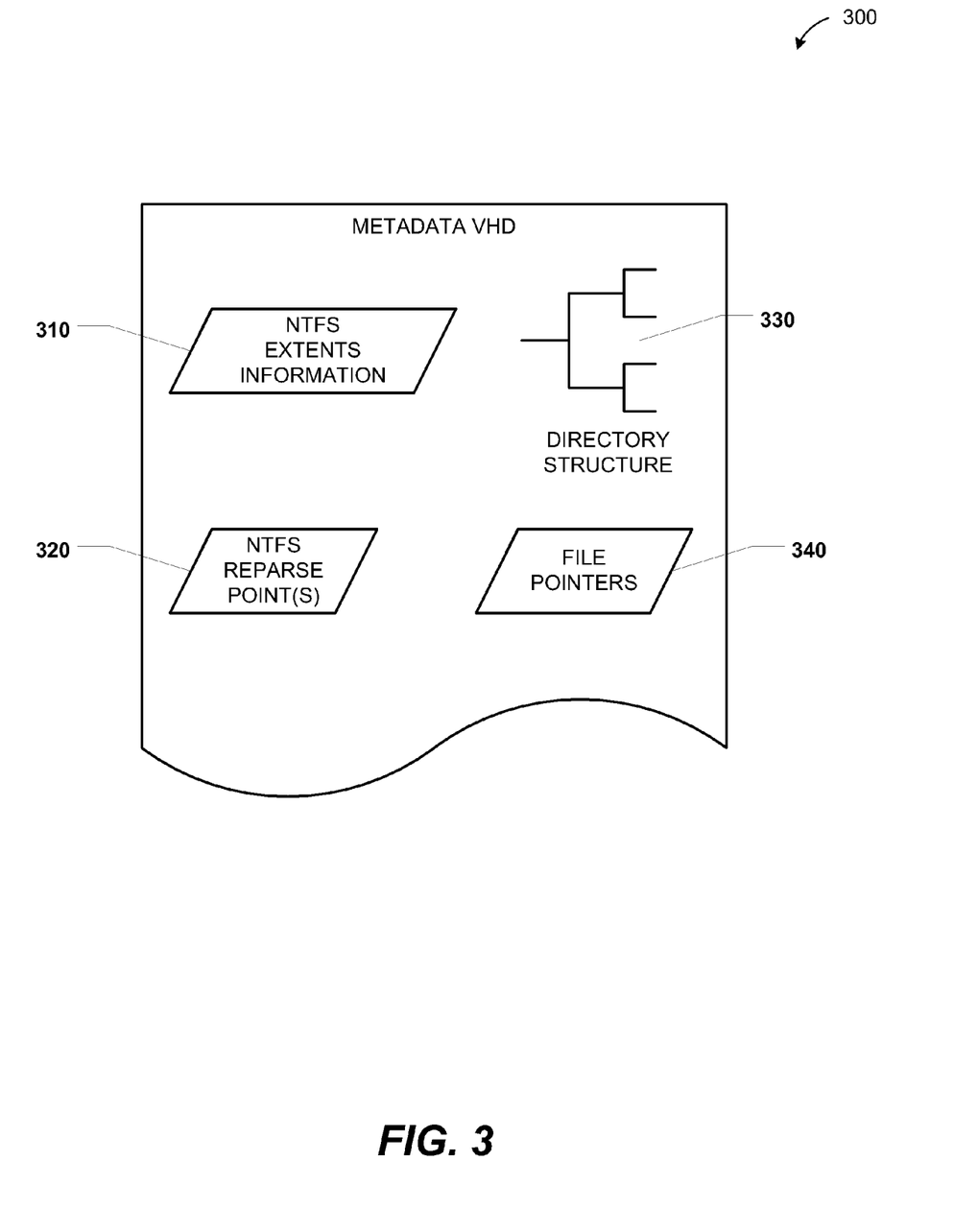
FIG. 3 is a diagram to illustrate a particular embodiment of the metadata VHD of FIG. 1 or FIG. 2.

FIG. 3 is a diagram to illustrate a particular embodiment of a metadata VHD 300. In an illustrative embodiment, the metadata VHD 300 is representative of the metadata VHD 114 of FIG. 1 or the metadata VHD 214 of FIG. 2. It should be noted that the features disclosed herein are explained in the context of NTFS for illustrative purposes only. Backup using metadata VHDs and differential VHDs as described herein may be used with other file systems.

In a particular embodiment, the metadata VHD 300 is used in an NTFS extents-based backup scheme. In such an embodiment, the metadata VHD 300 may include NTFS extents information 310. During backup operations, changed data may be written to a remote storage location in accordance with data run pointers stored in the NTFS extents information. During restore operations at a computer system, the metadata VHD 300 may be downloaded to the computer system, enabling browsing and selection of individual files to restore, and files selected for restoration may be downloaded from the remote storage location by traversing the data run pointers stored in the NTFS extents information.

In another particular embodiment, the metadata VHD 300 is used in conjunction with a metadata shredding-based backup scheme. In such an embodiment, the metadata VHD 300 may include directory structure information 330 and file pointers 340. During backup operations, the directory structure information 330 may be updated to reflect data changes at a data volume associated with the metadata VHD 300, and changed data may be stored at a remote storage location in accordance with the file pointers 340. During a restore operation, files selected for restoration may be fetched by traversing the file pointers 340.

In another particular embodiment, the metadata VHD 300 is used in an NTFS reparse points-based backup scheme. In such an embodiment, the metadata VHD 300 may include NTFS reparse points 320 and the directory structure information 330. During backup operations, the directory structure information 330 may be updated to reflect data changes at a data volume associated with the metadata VHD 300. The file names stored at the metadata VHD 300 may be NTFS reparse points 320 (e.g., symbolic links) to counterpart files stored at a remote storage location. During a restore operation, files selected for restoration may be downloaded by resolving the NTFS reparse points 320.

It will be appreciated that regardless of the particular backup scheme used (e.g., NTFS extents, metadata shredding, or NTFS reparse points), the metadata VHD 300 may enable dataless or reduced local data backup at a computer system. File data may instead be stored at a remote storage location. It will also be appreciated that the metadata VHD 300 may enable selective browsing and recovery of individual files.

Figure 4:
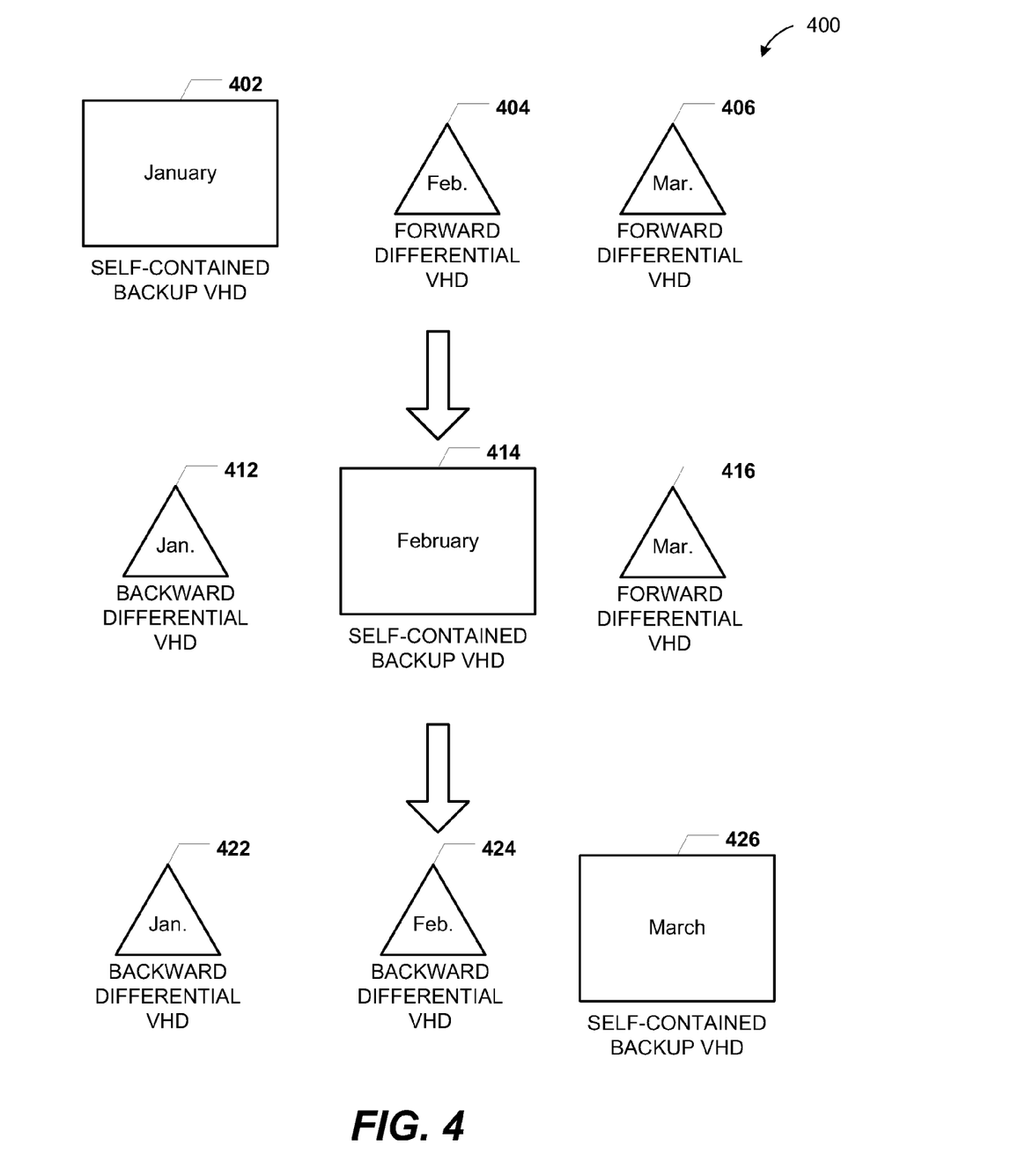
FIG. 4 is a diagram to illustrate a particular embodiment of a method of converting a forward differential VHD to a backward differential VHD.

FIG. 4 is a diagram to illustrate a particular embodiment of a method 400 of converting a forward differential VHD to a backward differential VHD. As described herein with respect to the differential VHD 144 of FIG. 1 and the forward differential VHDs 244 of FIG. 2, the use of differential VHDs may improve the performance of backup operations at a computer system by including changed portions, but not unchanged portions, of files at the computer system. However, as the number of forward differential VHDs increases (e.g., due to successive backup operations), the time taken to restore a file to a "current" state may increase. For example, if four successive backup operations occur after a backup VHD is created, then restoring a file that is updated often may include downloading changed portions of the file from each of four forward differential VHDs generated during the four successive backup operations. Reconstructing the updated file based on information from multiple forward differential VHDs may reduce overall performance of restoration or backup operations. Thus, in a particular embodiment, forward differential VHDs (e.g., stored at a remote storage location) may be converted to backward differential VHDs as illustrated in FIG. 4, to improve performance by reducing the number of differential VHDs referenced during restoration operations.

To illustrate conversion of forward differential VHDs to backward differential VHDs, consider a computer system making monthly backups to a remote storage location. During an initial backup in January (i.e., a January PIT), a self-contained backup VHD 402 is generated and transmitted to the remote storage location. The self-contained backup VHD 402 for January is said to be "self-contained" because files can be reverted to the January PIT without referencing other VHDs (e.g., differential VHDs). During a first subsequent backup operation in February, a forward differential VHD 404 is generated and transferred to the remote storage location, where the forward differential VHD 404 indicates file changes made between the January PIT and the February PIT. Similarly, during a second subsequent backup operation in March, a forward differential VHD 406 is generated and transferred to the remote storage location, where the forward differential VHD 406 indicates file changes made between the February PIT and the March PIT.

To restore a particular file to the January PIT, a computer system may download the particular file from the self-contained backup VHD 402. To restore the particular file to the February PIT, the computer system may download unchanged portions of the particular file from the self-contained backup VHD 402 and changed portions of the particular file from the forward differential VHD 404. To restore the particular file to the March PIT, the computer system may download unchanged portions of the particular file from the self-contained backup VHD 402 and changed portions of the particular file from both forward differential VHDs 404 and 406.

Based on observation of backup and restore patterns, it may be determined that a large percentage of restore operations involve restoring files to a most recent PIT. For example, in the embodiment illustrated in FIG. 4, a large percentage of restore operations may include restoring files to the March PIT. It will be noted that each such restore operation may involve downloading data from multiple forward differential VHDs (e.g., the forward differential VHDs 404 and 406). To improve the performance of such commonly occurring restore operations, the forward differential VHDs 404 and 406 may be converted to backward differential VHDs.

For example, the self-contained backup VHD 402 corresponding to the January PIT may be updated based on the forward differential VHD 404 corresponding to the February PIT. The resulting self-contained backup VHD 414 may enable files to be restored to the February PIT without referencing other VHDs. During the update operation, a backward differential VHD 412 corresponding to the January PIT is also created. The backward differential VHD 412 may effectively describe how to "undo" the changes made during the update operation, so that a file may be restored to the January PIT by downloading changed portions of the file from the self-contained backup VHD 414 and unchanged portions of the file from the backward differential VHD 412. The forward differential VHD 416 corresponding to the March PIT may be unchanged (e.g., the same as the forward differential VHD 406).

The update operation may then be repeated, generating a self-contained backup VHD 426 corresponding to the March PIT and a backward differential VHD 424 corresponding to the February PIT. The backward differential VHD 422 corresponding to the January PIT may remain unchanged (e.g., the same as the backward differential VHD 412). Thus, the commonly occurring restore operations with respect to the March PIT may no longer involve referencing multiple differential VHDs (e.g., a forward differential VHD for each of January and February).

It will be appreciated that converting forward differential VHDs into backward differential VHDs as illustrated in FIG. 4 may improve the performance of backup and restoration operations by reducing the number of differential VHDs referenced during commonly occurring restoration operations. For example, one or more differential VHDs (e.g., old differential VHDs that have not recently been used for recovery) may be merged into a self-contained backup VHD as illustrated, and such differential VHDs may be deleted. It will thus be appreciated that the method 400 of FIG. 4 may be used to improve backup and restoration performance at the system 100 of FIG. 1 or the system 200 of FIG. 2. In addition, the conversion of forward differential VHDs to backward differential VHDs may occur at the remote storage location (e.g., the remote storage location 150 of FIG. 1) without using computational resources at other computer systems (e.g., the computer system 110 of FIG. 1).

Figure 5:
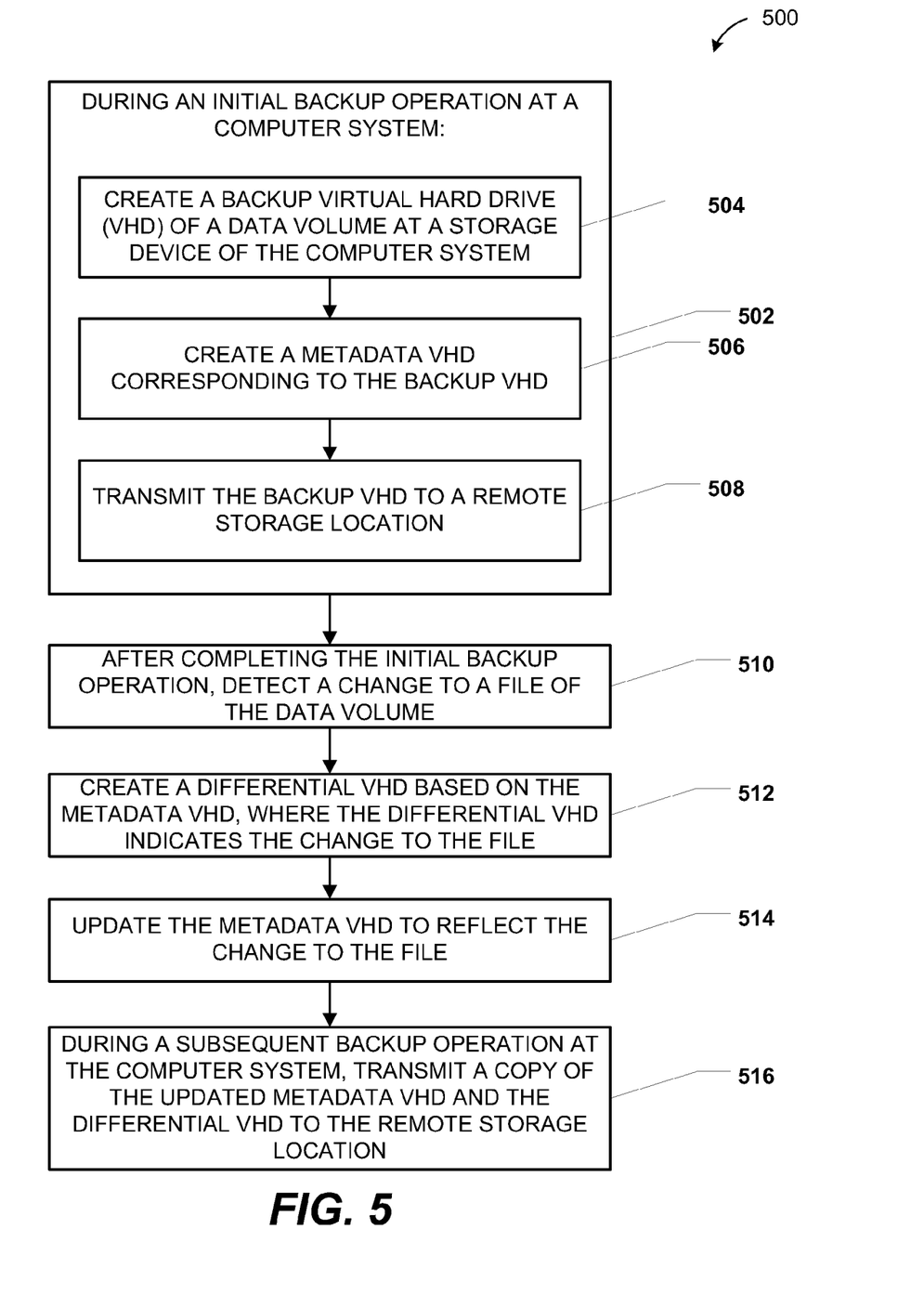
FIG. 5 is a flow diagram to illustrate a particular embodiment of a method of backup using a metadata VHD and a differential VHD.

FIG. 5 is a flow diagram to illustrate a particular embodiment of a method 500 of backup using a metadata VHD and a differential VHD. In an illustrative embodiment, the method 500 may be performed by the system 100 of FIG. 1 or the system 200 of FIG. 2.

The method 500 includes performing an initial backup operation at a computer system, at 502. For example, in FIG. 1, an initial backup operation may be performed at the computer system 110.

During the initial backup operation, the method 500 includes creating a backup VHD of a data volume at a storage device of the computer system, at 504. For example, in FIG. 1, the backup VHD 140 may be created, where the backup VHD is associated with a data volume at the memory 112 that includes the files 116. The method 500 also includes, during the initial backup operation, creating a metadata VHD corresponding to the backup VHD, at 506. For example, in FIG. 1, the metadata VHD 114 may be created. The method 500 further includes, during the initial backup operation, transmitting the backup VHD to a remote storage location, at 508. For example, in FIG. 1, the backup VHD 140 may be transmitted to the remote storage location 150.

The method 500 includes detecting a change to a file of the data volume after completing the initial backup operation, at 510. For example, in FIG. 1, the backup agent 118 may detect a change to a particular file of the files 116.

The method 500 also includes creating a differential VHD based on the metadata VHD, where the differential VHD indicates the change to the file, at 512. For example, in FIG. 1, the VHD module 122 may create the differential VHD 144, where the differential VHD 114 indicates changes to the particular file of the files 116.

The method 500 further includes updating the metadata VHD to reflect the change to the file, at 514. For example, in FIG. 1, the metadata VHD 114 may be updated. The method 500 includes, during a subsequent backup operation at the computer system, transmitting a copy of the updated metadata VHD and the differential VHD to the remote storage location, a 516. For example, in FIG. 1, the copy 142 of the metadata VHD 114 and the differential VHD 144 may be transmitted to the remote storage location 150.

It will be appreciated that the method 500 of FIG. 5 may enable dataless or reduced local data backup at a computer system. It will also be appreciated that the method 500 of FIG. 5 may increase available storage space at the computer system by transmitting backup data to a remote storage location.

Figure 6:
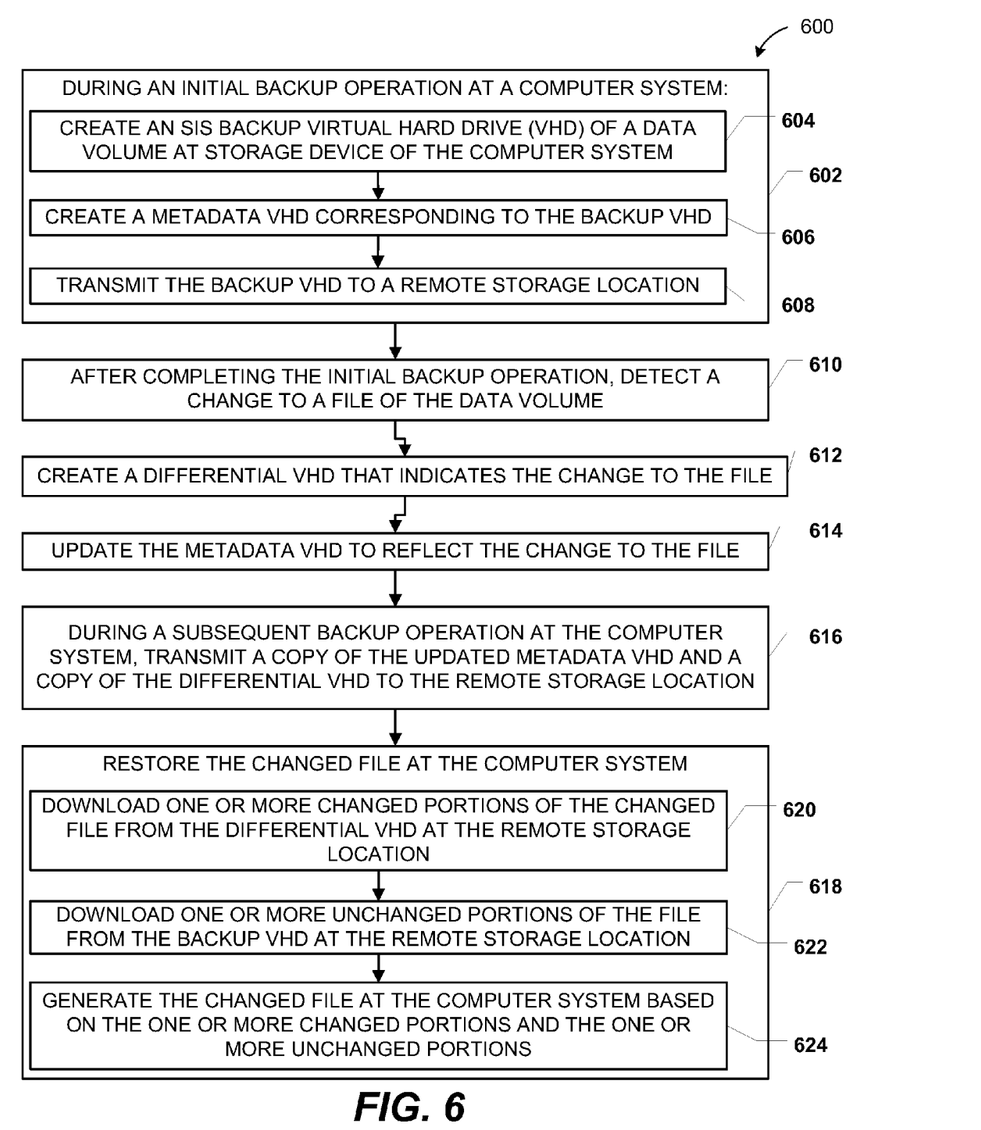
FIG. 6 is a flow diagram to illustrate another particular embodiment of a method of backup using a metadata VHD and a differential VHD.

FIG. 6 is a flow diagram to illustrate another particular embodiment of a method 600 of backup using a metadata VHD and a differential VHD. In an illustrative embodiment, the method 600 may be performed by the system 100 of FIG. 1 or the system 200 of FIG. 2.

The method 600 includes performing an initial backup operation at a computer system, at 602. For example, in FIG. 1, an initial backup operation may be performed at the computer system 110.

During the initial backup operation, the method 600 includes creating a single-instance storage (SIS) backup VHD of a data volume at a storage device of the computer system, at 604. For example, in FIG. 1, the backup VHD 140 may be created, where the backup VHD 140 is associated with a data volume at the memory 112 that includes the files 116. The method 600 also includes, during the initial backup operation, creating a metadata VHD corresponding to the backup VHD, at 606. For example, in FIG. 1, the metadata VHD 114 may be created. The method 600 further includes, during the initial backup operation, transmitting the backup VHD to a remote storage location, at 608. For example, in FIG. 1, the backup VHD 140 may be transmitted to the remote storage location 150.

The method 600 includes detecting a change to a file of the data volume after completing the initial backup operation, at 610. For example, in FIG. 1, the backup agent 118 may detect a change to a particular file of the files 116.

The method 600 also includes creating a differential VHD that indicates the change to the file, at 612. For example, in FIG. 1, the VHD module 122 may create the differential VHD 144, where the differential VHD 114 indicates changes to the particular file of the files 116.

The method 600 further includes updating the metadata VHD to reflect the change to the file, at 614. For example, in FIG. 1, the metadata VHD 114 may be updated. The method 600 includes, during a subsequent backup operation at the computer system, transmitting a copy of the updated metadata VHD and the differential VHD to the remote storage location, a 616. For example, in FIG. 1, the copy 142 of the metadata VHD 114 and the differential VHD 144 may be transmitted to the remote storage location 150.

Once backup data has been transmitted to a remote storage location, the backup data may be used to restore files. For example, a user at a computer system may initiate a restoration operation at the computer system. The method 600 also includes restoring the changed file at the computer system, at 618. Restoring the changed file at the computer system includes downloading one or more changed portions of the changed file from the differential VHD at the remote storage location, at 620. For example, in FIG. 1, one or more changed portions of the particular file of the files 116 may be downloaded from the differential VHD 144 at the remote storage location 150. In a particular embodiment, the changed portions of the particular file of the files 116 are downloaded as described herein with respect to the changed portions 262 of FIG. 2.

Restoring the changed file at the computer system also includes downloading one or more unchanged portions of the file from the backup VHD at the remote storage location, at 622. For example, in FIG. 1, one or more unchanged portions of the files 116 may be downloaded from the backup VHD 140 at the remote storage location 150. In a particular embodiment, the unchanged portions of the files 116 are downloaded as described herein with respect to the unchanged portions 264 of FIG. 2.

Restoring the changed file at the computer system further includes generating the changed file at the computer system based on the one or more changed portions and the one or more unchanged portions, at 624. For example, in FIG. 1, the files 116 may be restored based on the one or more changed portions and the one or more unchanged portions. For example, the one or more changed portions and the one or more unchanged portions may be combined at the computer system to form the restored file.

Figure 7:
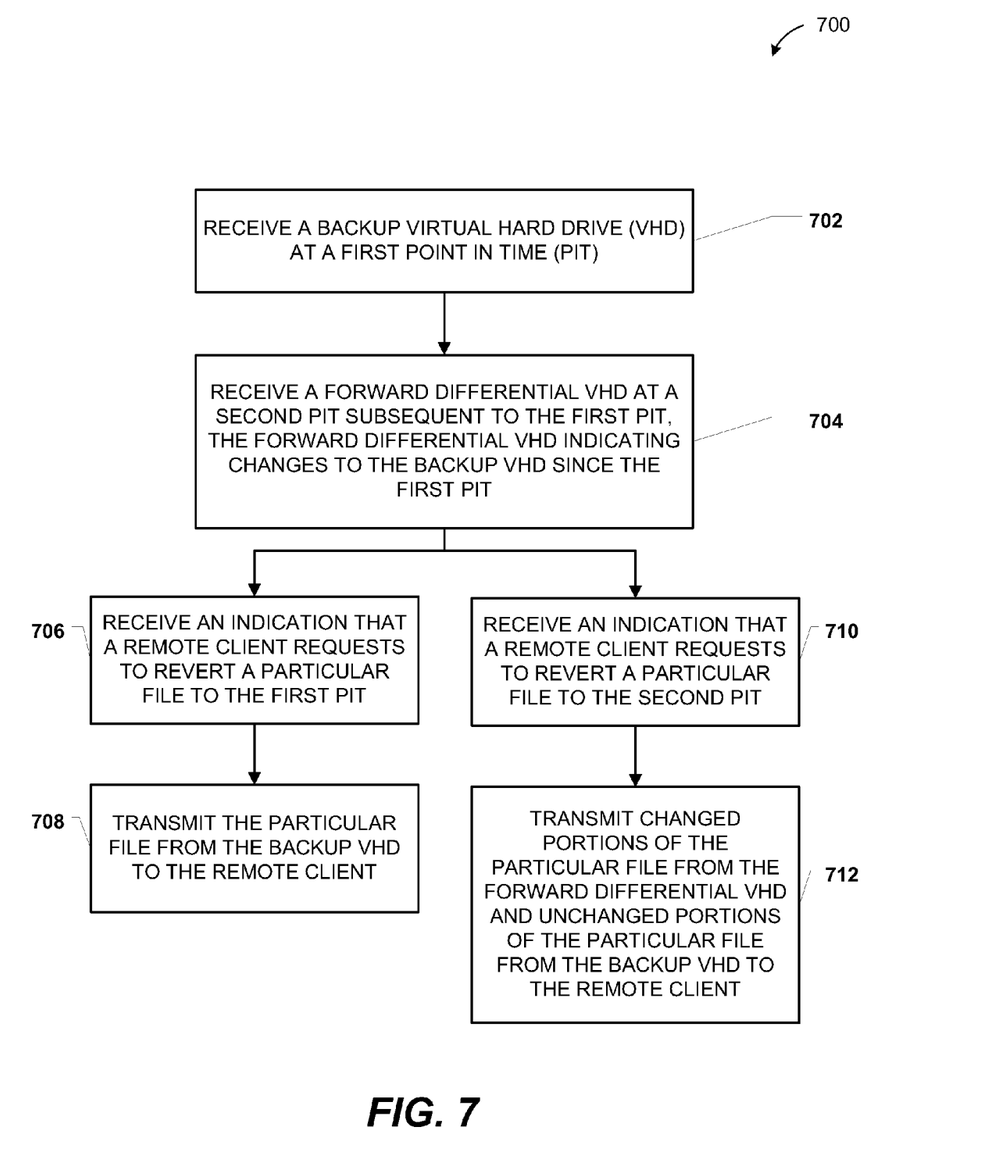
FIG. 7 is a flow diagram to illustrate a particular embodiment of a method of supporting backup using differential VHDs.

FIG. 7 is a flow diagram to illustrate a particular embodiment of a method 700 of supporting backup using differential VHDs. In an illustrative embodiment, the method 700 may be performed at the remote storage location 150 of FIG. 1 or the online cloud storage location 250 of FIG. 2.

The method 700 includes receiving a backup VHD at a first PIT, at 702. For example, referring to FIG. 2, the backup VHD 240 may be received at the online cloud storage location 250.

The method 700 also includes receiving a forward differential VHD at a second PIT subsequent to the first PIT, where the forward differential VHD indicates changes to the backup VHD since the first PIT, at 704. For example, referring to FIG. 2, one of the forward differential VHDs 244 may be received at the online cloud storage location 250 subsequent to the receipt of the backup VHD 240.

The method 700 further includes supporting restore operations at a remote client. When an indication that a remote client requests to revert a particular file to the first PIT is received, at 706, the method 700 includes transmitting the particular file from the backup VHD to the remote client, at 708. For example, referring to FIG. 2, the online cloud storage location 250 may transmit a particular file to the second computer system 270 in response to receiving an indication that the second computer system 270 requests to revert a particular file to the first PIT.

When an indication that a remote client requests to revert a particular file to the second PIT is received, at 710, the method 700 includes transmitting changed portions of the particular file from the forward differential VHD and transmitting unchanged portions of the particular file from the backup VHD to the remote client, at 712. For example, referring to FIG. 2, the online cloud storage location 250 may transmit the changed portions 262 and the unchanged portions 264 to the second computer system 270.

Figure 8:
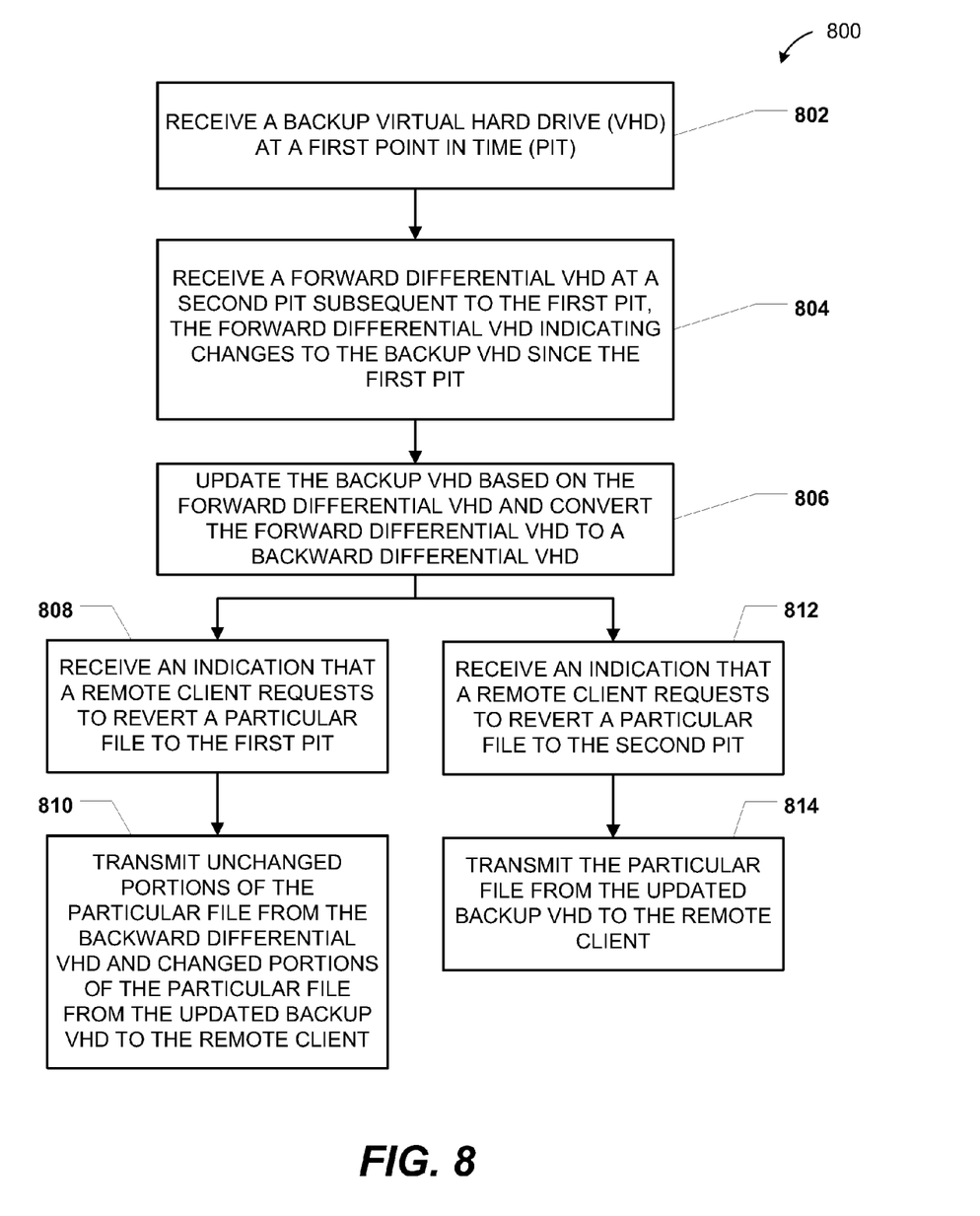
FIG. 8 is a flow diagram to illustrate another particular embodiment of a method of supporting backup using differential VHDs, including converting a forward differential VHD to a backward differential VHD.

As described previously with respect to FIG. 4, converting forward differential VHDs to backward differential VHDs may improve the performance of backup and restore operations. FIG. 8 is a flow diagram to illustrate another particular embodiment of a method 800 of supporting backup differential VHDs, including converting a forward differential VHD to a backward differential VHD. In an illustrative embodiment, the method 800 may be performed at the remote storage location 150 of FIG. 1 or the online cloud storage location 250 of FIG. 2.

The method 800 includes receiving a backup VHD at a first PIT, at 802. For example, referring to FIG. 2, the backup VHD 240 may be received at the online cloud storage location 250.

The method 800 also includes receiving a forward differential VHD at a second PIT subsequent to the first PIT, where the forward differential VHD indicates changes to the backup VHD since the first PIT, at 804. For example, referring to FIG. 2, one of the forward differential VHDs 244 may be received at the online cloud storage location 250 subsequent to the receipt of the backup VHD 240.

The method 800 further includes updating the backup VHD based on the forward differential VHD and converting the forward differential VHD to a backward differential VHD, at 806. For example, referring to FIG. 2, the backup VHD 240 may be updated based on one of the forward differential VHDs 244, and the forward differential VHD may be converted to a backward differential VHD. In a particular embodiment, the update and conversion operations are performed as described herein with respect to the VHDs 402-426 of FIG. 4.

The method 800 includes supporting restore operations at a remote client. When an indication that a remote client requests to revert a particular file to the first PIT is received, at 808, the method 800 includes transmitting unchanged portions of the particular file from the backward differential VHD and changed portions of the particular file from the updated backup VHD to the remote client, at 810. For example, referring to FIG. 2, the online cloud storage location 250 may transmit the changed portions 262 and the unchanged portions 264 to the second computer system 270.

When an indication that a remote client requests to revert a particular file to the second PIT is received, at 812, the method 800 includes transmitting the particular file from the updated backup VHD to the remote client, at 814. For example, referring to FIG. 2, the online cloud storage location 250 may transmit a particular file to the second computer system 270 in response to receiving an indication that the second computer system 270 requests to revert the particular file to the second PIT.

Figure 9:
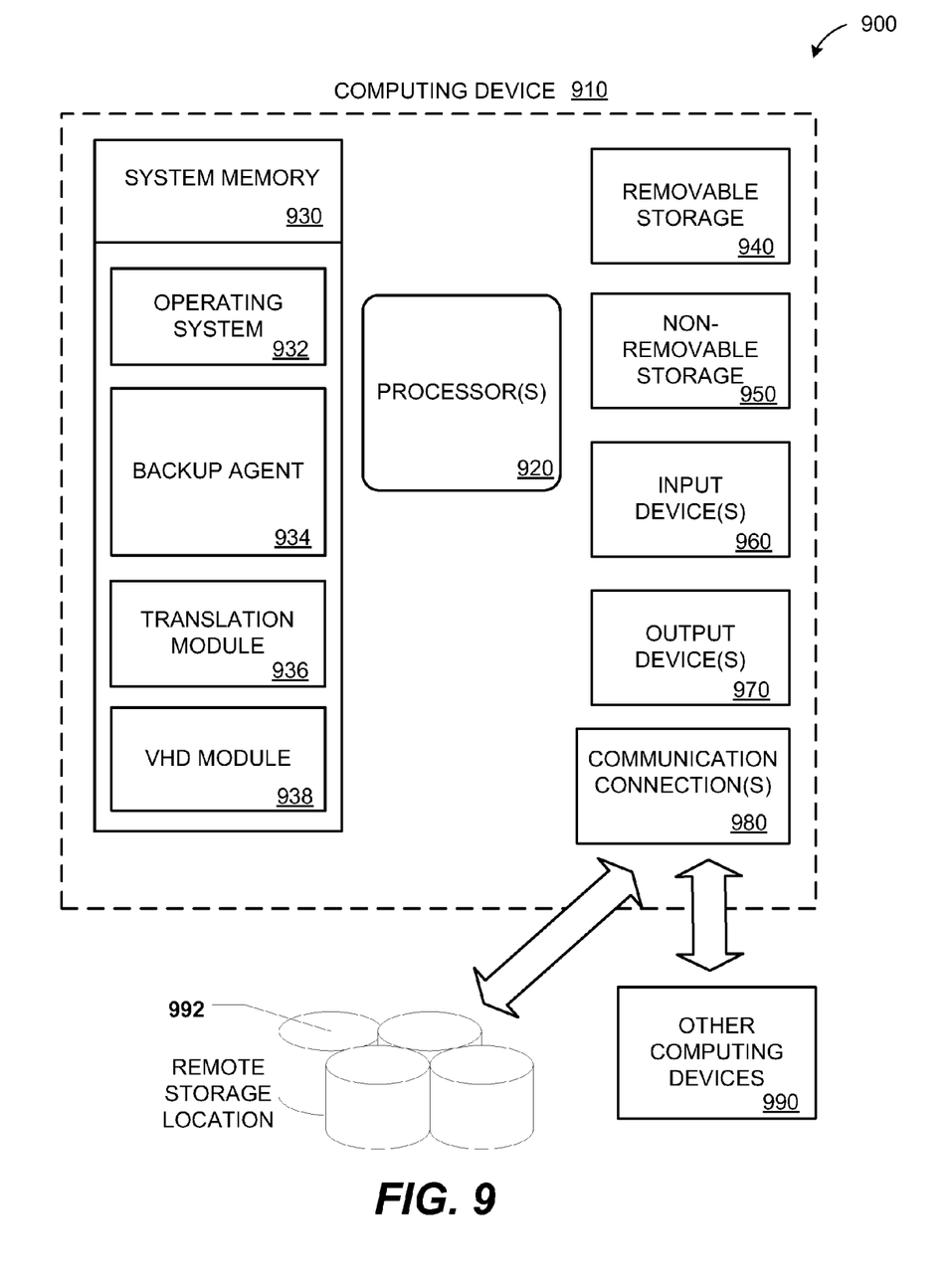
FIG. 9 is a block diagram of a computing environment including a computing device operable to support embodiments of computer-implemented methods, computer program products, and system components as illustrated in FIGS. 1-8.

FIG. 9 depicts a block diagram of a computing environment 900 including a computing device 910 operable to support embodiments of computer-implemented methods, computer program products, and system components according to the present disclosure. In an illustrative embodiment, the computing device 910 may include the network interface 124 of FIG. 1, the memory 112 of FIG. 1, the agent/modules 118, 120, 122 of FIG. 1, the remote storage location 150 of FIG. 1, the memories 212, 272 of FIG. 2, or the online cloud storage location 250 of FIG. 2. Each of the network interface 124 of FIG. 1, the memory 112 of FIG. 1, the agent/modules 118, 120, 122 of FIG. 1, the remote storage location 150 of FIG. 1, the memories 212, 272 of FIG. 2, or the online cloud storage location 250 of FIG. 2 may include or be implemented using the computing device 910 or a portion thereof.

The computing device 910 includes at least one processor 920 and a system memory 930. Depending on the configuration and type of computing device, the system memory 930 may be volatile (such as random access memory or "RAM"), non-volatile (such as read-only memory or "ROM," flash memory, and similar memory devices that maintain stored data even when power is not provided), or some combination of the two. The system memory 930 typically includes an operating system 932, one or more application platforms, one or more applications (e.g., a backup agent 934, a translation module 936, and a VHD module 938), and may include program data associated with the one or more applications. In an illustrative embodiment, the backup agent 934 is the backup agent 118 of FIG. 1, the translation module 936 is the translation module 120 of FIG. 1, and the VHD module 938 is the VHD module 122 of FIG. 1.

The computing device 910 may also have additional features or functionality. For example, the computing device 910 may also include removable and/or non-removable additional data storage devices such as magnetic disks, optical disks, tape, and standard-sized or miniature flash memory cards. Such additional storage is illustrated in FIG. 9 by removable storage 940 and non-removable storage 950. In an illustrative embodiment, such additional storage includes the memory 112 of FIG. 1, the memory 212 of FIG. 2, or the memory 272 of FIG. 2. Computer storage media may include volatile and/or non-volatile storage and removable and/or non-removable media implemented in any method or technology for storage of information such as computer-readable instructions, data structures, program components or other data. The system memory 930, the removable storage 940 and the non-removable storage 950 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 910. Any such computer storage media may be part of the computing device 910. The computing device 910 may also have input device(s) 960, such as a keyboard, mouse, pen, voice input device, touch input device, etc. Output device(s) 970, such as a display, speakers, printer, etc. may also be included.

The computing device 910 also contains one or more communication connections 980 that allow the computing device 910 to communicate with other computing devices 990 over a wired or a wireless network. In an illustrative embodiment, the communication connections 980 include the network interface 120 of FIG. 1. The one or more communication connections 980 may also allow the computing device 910 to communicate with a remote storage location 992. In an illustrative embodiment, the remote storage location 992 is the remote storage location 150 of FIG. 1 or the online cloud storage location 250 of FIG. 2.

It will be appreciated that not all of the components or devices illustrated in FIG. 9 or otherwise described in the previous paragraphs are necessary to support embodiments as herein described. For example, the input device(s) 960 and output device(s) 970 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable any person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
during an initial backup operation at a computer system:
creating a backup virtual hard drive (VHD) of a data volume at a storage device of the computer system;
creating a metadata VHD corresponding to the backup VHD;
storing the metadata VHD at a memory within the computer system; and
transmitting the backup VHD from the computer system to a remote storage location while the metadata VHD is retained at the computer system;
after completion of the initial backup operation, detecting a change to a file of the data volume;
creating a differential VHD at the computer system based on the metadata VHD stored in the memory of the computer system, wherein the differential VHD indicates the change to the file;
updating the metadata VHD at the computer system to reflect the change to the file; and
during a subsequent backup operation at the computer system, transmitting a copy of the updated metadata VHD and the differential VHD from the computer system to the remote storage location.

2. The method of claim 1, wherein the metadata VHD is usable to browse files stored at the backup VHD, search files stored at the backup VHD, or any combination thereof.

3. The method of claim 1, wherein the differential VHD is created without accessing information from the remote storage location.

4. The method of claim 1, further comprising storing the copy of the updated metadata VHD and the differential VHD at the remote storage location.

5. The method of claim 4, further comprising restoring the changed file at a second computer system by:

downloading one or more changed portions of the file from the differential VHD at the remote storage location to the second computer system;

downloading one or more unchanged portions of the file from the backup VHD at the remote storage location to the second computer system; and generating the changed file at the second computer system based on the one or more changed portions and the one or more unchanged portions.

6. The method of claim 4, further comprising restoring the changed file at the computer system by:

downloading one or more changed portions of the file from the differential VHD at the remote storage location to the computer system;

downloading one or more unchanged portions of the file from the backup VHD at the remote storage location to the computer system; and generating the changed file at the computer system based on the one or more changed portions and the one or more unchanged portions.

7. The method of claim 4, further comprising:

detecting a second change to the file, wherein the second change is detected after the first change;

creating a second differential VHD based on the updated metadata VHD, wherein the second differential VHD indicates the second change to the file;

updating the updated metadata VHD to produce a twice updated metadata VHD that reflects the second change to the file; and transmitting a copy of the twice-updated metadata VHD and the second differential VHD from the computer system to the remote storage location.

8. The method of claim 7, further comprising restoring the file with the second change at the computer system by:

downloading one or more first changed portions of the file from the differential VHD and one or more second changed portions of the file from the second differential VHD at the remote storage location to the computer system;

downloading one or more unchanged portions of the file from the backup VHD at the remote storage location to the computer system; and generating the twice-changed file a the second computer system based on the one or more first changed portions, the one or more second changed portions, and the one or more unchanged portions.

9. The method of claim 7, wherein the differential VHD and the second differential VHD are forward differential VHDs, the method further comprising converting the forward differential VHDs to backward differential VHDs.

10. The method of claim 1, wherein the backup VHD is a single-instance storage (SIS) VHD.

11. The method of claim 1, wherein the remote storage location is an online cloud storage location.

12. The method of claim 1, wherein the metadata VHD includes NT File System (NTFS) extent information for files of the data volume, at least one NTFS reparse point, or any combination thereof.

13. The method of claim 1, wherein the metadata VHD stored at the memory of the computer system includes a directory structure corresponding to the data volume and a file pointer for the file, wherein the file pointer points to a copy of the file at the backup VHD stored at the remote storage location.

14. The method of claim 1, wherein the computer system is located at a second remote storage location that is different than the remote storage location.

15. A computer system, comprising:

a memory device comprising files stored in accordance with a file system, the file system in a data volume of the memory device;

a processor having access to the memory device, the processor to:

create a backup virtual hard drive (VHD) of the data volume;

create a metadata VHD corresponding to the backup VHD;

store the metadata VHD at the memory device; and use a network interface to transmit the backup VHD to a remote storage device;

a backup agent configured to detect changes to the files;

a translation module configured to translate the detected changes to virtual hard drive (VHD) formatted changes;

a VHD module configured to write the VHD formatted changes to the metadata VHD stored at the memory device and to generate a differential VHD based on the metadata VHD; and the processor to use the network interface to transmit a copy of the metadata VHD and the differential VHD to the remote storage device.

16. The computer system of claim 15, wherein the file system is an NT File System (NTFS) or a File Allocation Table (FAT) file system.

17. A computer-readable storage device comprising instructions, that when executed by a processor, cause the processor to:

receive a backup virtual hard drive (VHD) at a first point in time (PIT);

receive a first forward differential VHD at a second PIT subsequent to the first PIT, the first forward differential VHD indicating changes to the backup VHD between the first PIT and the second PIT;

receive a second forward differential VHD at a third PIT subsequent to the second PIT, the second forward differential VHD indicating changes to the backup VHD between the second PIT and the third PIT; and generating a third self-contained backup VHD corresponding to the third PIT and a second backward differential VHD corresponding to the second PIT, wherein prior to generating the third self-contained backup VHD, to restore a particular file to the third PIT, a computer system downloads unchanged portions of the particular file from the backup VHD and changed portions of the particular file from the first forward differential VHD and the second forward differential VHD, and wherein after generating the third self-contained backup VHD, the particular file is restorable to the third PIT by the computer system by using the third self-contained backup VHD without relying on the first forward differential VHD or the second forward differential VHD.

18. The computer-readable storage device of claim 17, wherein the backup VHD is self-contained, such that a file is restorable to the first PIT using the backup VHD without referencing a differential VHD; and wherein the third self-contained backup VHD is generated by merging multiple differential VHDs.

19. The computer-readable storage device of claim 18, further comprising instructions, that when executed by the processor, cause the processor to:

update the backup VHD based on the third self-contained backup VHD; and delete the first forward differential VHD and the second forward differential VHD.

20. The computer-readable storage device of claim 18, further comprising instructions, that when executed by the processor, cause the processor to:
- update the backup VHD based on the first forward differential VHD; and
- convert the first forward differential VHD to the second backward differential VHD corresponding to the second PIT.

21. The computer system of claim 15, wherein the metadata VHD is usable to browse files stored at the backup VHD, to search files stored at the backup VHD, or any combination thereof.

22. The computer system of claim 15, wherein the processor restores a file by:
- downloading one or more changed portions of the file from the differential VHD at the remote storage device; and
- downloading one or more unchanged portions of the file from the backup VHD at the remote storage device.

23. A computer-readable storage device comprising instructions, that when executed by a processor, cause the processor to:
- store files in a file system, the file system in a data volume of a memory device;
- create a backup virtual hard drive (VHD) of the data volume;
- create a metadata VHD corresponding to the backup VHD;
- store the metadata VHD at the memory device;
- control a network interface to transmit the backup VHD to a remote storage device;
- detect changes to the files;
- translate the detected changes to virtual hard drive (VHD) formatted changes;
- write the VHD formatted changes to the metadata VHD stored at the memory device and generate a differential VHD based on the metadata VHD; and
- control the network interface to transmit a copy of the metadata VHD and the differential VHD to the remote storage device.

24. A computer system, comprising:
- a processor;
- a computer readable storage device comprising instructions, that when executed by the processor, cause the processor to:
    - receive a backup virtual hard drive (VHD) at a first point in time (PIT);
    - receive a first forward differential VHD at a second PIT subsequent to the first PIT, the first forward differential VHD indicating changes to the backup VHD between the first PIT and the second PIT;
    - receive a second forward differential VHD at a third PIT subsequent to the second PIT, the second forward differential VHD indicating changes to the backup VHD between the second PIT and the third PIT; and
    - generate a third self-contained backup VHD corresponding to the third PIT and a second backward differential VHD corresponding to the second PIT, wherein prior to generating the third self-contained backup VHD, the processor restores a particular file to the third PIT, downloads unchanged portions of the particular file from the backup VHD and changed portions of the particular file from the first forward differential VHD and from the second forward differential VHD, and wherein after generating the third self-contained backup VHD, the particular file is restorable to the third PIT by using the third self-contained backup VHD without relying on the first forward differential VHD or the second forward differential VHD.

* * * * *